UNITED STATES PATENT OFFICE.

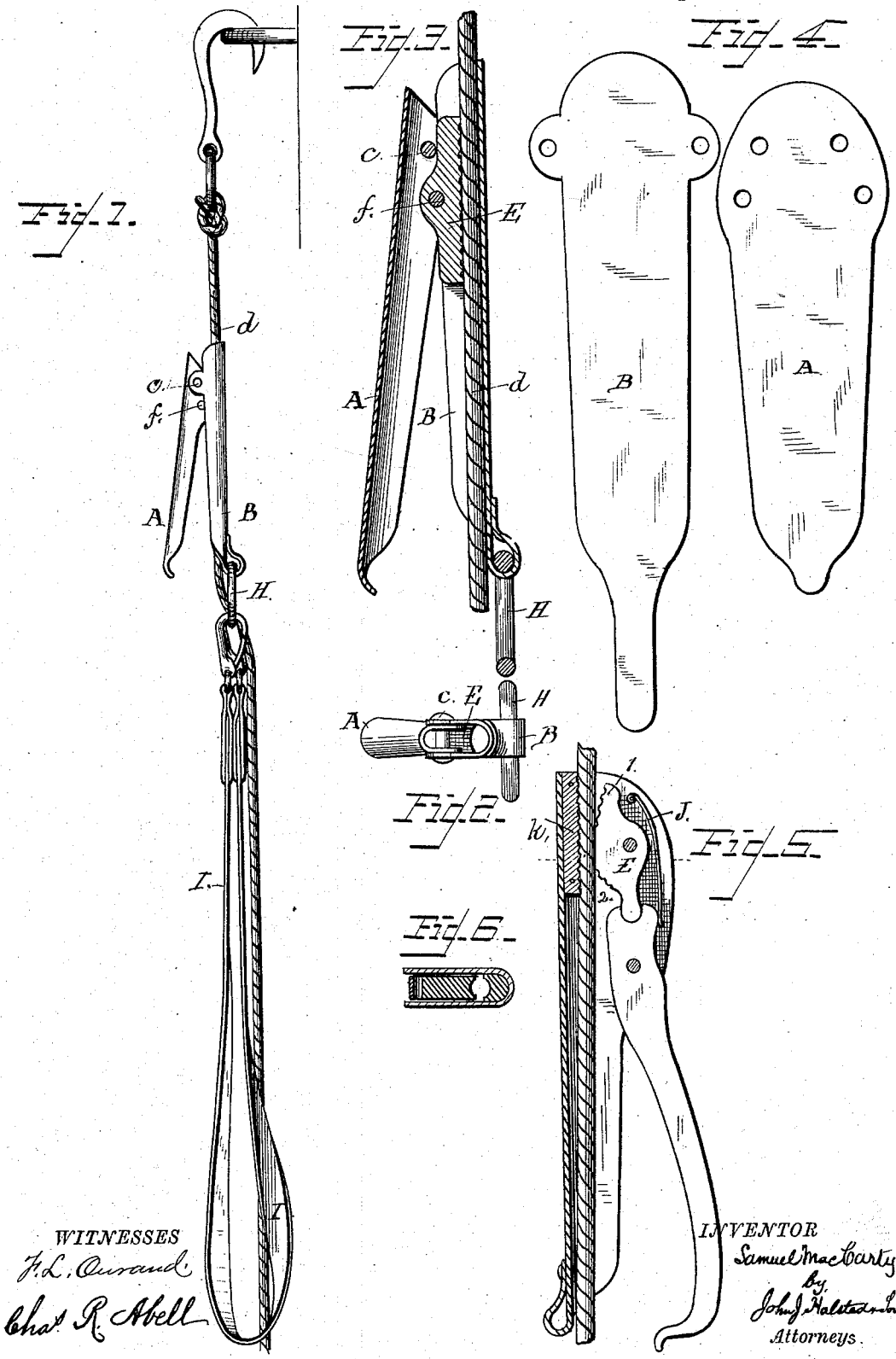

SAMUEL MacCARTY, OF AURORA, ILLINOIS.

FIRE-ESCAPE.

SPECIFICATION forming part of Letters Patent No. 284,451, dated September 4, 1883.

Application filed March 14, 1883. (No model.)

*To all whom it may concern:*

Be it known that I, SAMUEL MACCARTY, of Aurora, in the county of Kane and State of Illinois, have invented certain new and useful Improvements in Fire-Escapes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention belongs to that class of fire-escapes known as "friction-escapes," and in which a flexible rope is employed; and it consists in a special construction, which will be made clear by the description and drawings.

Figure 1 is an elevation of my apparatus all ready for use; Fig. 2, an end view of the top of the levers; Fig. 3, an enlarged longitudinal section; Fig. 4, the blanks from which the levers are made; Fig. 5, a longitudinal section of a modification, and Fig. 6 a cross-section of the same.

A and B are two levers, jointed at $c$, and made of any suitable metal—such as iron, steel, brass, or malleable iron. Each is concave in its cross-section, so that a rope passing between them, as seen at $d$, may be protected, and so that the levers shall constitute a sort of tube at that part where they are connected. The bolt at $c$ should be a strong one.

E is a clamping-dog or two-armed swing-lever, applied to work freely on its fulcrum-pin $f$, and, as will be seen, this dog is lodged partly in the concave of one of the levers, its biting or clamping edge projecting beyond the edge of such lever and reaching into the concave of the other lever, in order that it may clamp the rope when needful. The under or biting surface of this dog E should be grooved lengthwise to conform somewhat to the cylindrical form of the rope, and should also be roughened or serrated, that it may take a firmer and surer grip upon the rope, and to prevent any possibility of the slipping of the rope during such grip.

G is a hook fast to one end of the rope, and H is a guide-ring at the lower end of lever B, and through which the rope may pass, as shown; and to this ring is connected, by snap-hook or otherwise, a strong strap or belt, I, intended to be passed around the body of the person beneath his arms, and then fastened at its other end by a snap-hook or other equivalent device to the same ring. Upon grasping A and B in the hand, near the ends of their longer arms, the dog E is not only forced against the rope, but, by reason of this dog being hung on a pivot and having a gripping-surface along its whole length, it can self-adapt itself to any position needed, owing to any variation in the surface or thickness of the rope. The position of this dog so near to the fulcrum of the levers also allows a comparatively small muscular action of the hand to grip the rope most powerfully, so much so that it is an easy matter to clamp it tight enough to sustain many hundreds of pounds without any liability of slipping. The dog, it will be seen, is well housed in and protected by the concave levers. These levers are preferably made of strong sheet metal, stamped or cut of appropriate shape, and with ears to receive the bolt $c$ and pin $f$, and one of them is shown long enough at its lower end to be turned backward and riveted upon itself to form an eye to receive the ring H. These flat blanks are then bent lengthwise to form each a half-tube, and of such relative size in cross-section that the one carrying the swing-dog E may, at the place where they are pivoted together, lie between the ears of the other lever. This makes the construction economical, while the bent or arched form of the levers gives them great strength with little metal. To use the device, the belt is passed around the person under the arms, both ends of the belt being secured in the ring, the gripping-levers are taken in the hand, the hook is secured to the inside window-sill, or to a bedstead or any other suitable object, and the free end of the rope thrown out the window. Then, upon getting out of the window, by holding the gripping-levers with a tolerable grip they will permit the person to hang supported by the belt, and upon slacking or relaxing his grip he can let himself down as slowly or as rapidly as he chooses, and stop at any time by tightening his grip.

In practice it is found that this device will hold two persons weighing each two hundred pounds with no more exertion of strength than that of the hand of a man of average muscle.

In Figs. 5 and 6 is shown a slight variation in the construction, a spring, J, being employed to bear against the lever A and set the dog E firmly against the rope, so that in case a person descending from a window or burning building should unconsciously or otherwise loosen his grip the spring would press the dog down on the rope and hold it fast until the person should grasp the lever and set it free. The dog E in such case is preferably made with its under surface somewhat cam-shaped, and with its upper gripping end, 1, less curved than its lower one, 2, so that a little tighter grip by the person than is sufficient to loosen the dog, as just previously stated, will throw the end 1 of the dog down upon the rope and prevent its running too fast.

A piece, K, concaved and roughened or corrugated crosswise, and placed within the part A, may be used to give greater friction on the rope when the dog is pressed by the lever A. The dog and this lever may be made of cast-iron, or of malleable or wrought iron.

I claim—

1. In a frictional fire-escape, the levers A and B, each being a half-tube and jointed together, combined with a swing-dog pivoted to one of these levers, near its fulcrum, and a rope passing between such levers and lying in the continuous concave of one of them, all as shown and described.

2. The levers A B of a fire-escape, each made of a sheet-metal blank and bent longitudinally to an arch form, the one being fulcrumed between ears on the other, and having a swing-dog, E, pivoted in its concave, all as shown and described.

3. In combination, the lever A, having a roughened or corrugated concaved portion, K, lever B, swing-dog E, and spring J, all substantially as shown and described.

SAMUEL MacCARTY.

Witnesses:
 M. O. SOUTHWORTH,
 A. J. KING.